United States Patent
Goldmann

[11] Patent Number: 5,808,656
[45] Date of Patent: Sep. 15, 1998

[54] ARRANGEMENT AND PROCESS FOR GENERATING A MATRIX IMAGE ON A PHOTOSENSITIVE RECORDING SUBSTRATE

[75] Inventor: Gerd Goldmann, München, Germany

[73] Assignee: Oce Printing Systems GmbH, Poing, Germany

[21] Appl. No.: 617,846

[22] PCT Filed: Sep. 13, 1994

[86] PCT No.: PCT/DE94/01047

§ 371 Date: Mar. 15, 1996

§ 102(e) Date: Mar. 15, 1996

[87] PCT Pub. No.: WO95/08160

PCT Pub. Date: Mar. 23, 1995

[30] Foreign Application Priority Data

Sep. 15, 1993 [DE] Germany .......................... 43 31 360.4

[51] Int. Cl.$^6$ .............................. B41J 2/45; G01D 15/14; H04N 1/40
[52] U.S. Cl. ............................................. 347/238; 358/471
[58] Field of Search ................................... 347/238, 234, 347/233, 237, 225, 224, 129, 132; 359/621, 455; 372/50, 45, 98; 358/471

[56] References Cited

U.S. PATENT DOCUMENTS

| | | |
|---|---|---|
| 4,404,571 | 9/1983 | Kitamura . |
| 4,774,524 | 9/1988 | Warbus et al. . |
| 5,073,041 | 12/1991 | Rastani . |
| 5,274,394 | 12/1993 | Corona et al. .......................... 347/237 |
| 5,525,810 | 6/1996 | Jewell et al. ............................. 250/566 |

FOREIGN PATENT DOCUMENTS

| | | |
|---|---|---|
| 0 363 347 A3 | 4/1990 | European Pat. Off. . |
| 0 521 491 A2 | 1/1993 | European Pat. Off. . |
| 0 544 002 A1 | 6/1993 | European Pat. Off. . |
| 29 19 587 | 12/1979 | Germany . |
| 30 34 055 a1 | 4/1981 | Germany . |
| 31 19 461 A1 | 2/1982 | Germany . |
| 36 28 915 A1 | 3/1987 | Germany . |
| 54-94344 | 7/1979 | Japan . |
| 3-132369 | 5/1991 | Japan . |
| WO 91/09352 | 6/1991 | WIPO . |
| WO 94/18802 | 8/1994 | WIPO . |

*Primary Examiner*—N. Le
*Assistant Examiner*—Thinh Nguyen
*Attorney, Agent, or Firm*—Hill & Simpson

[57] ABSTRACT

An electrophotographic printing or copying machine contains as image source a laser diode array (10) having a multiplicity of individually excitable laser diodes (11) which are arranged thereon in a predetermined grid for forming an excitation pattern. Furthermore, a deflection unit (13) deflecting the light beams from the laser diode array (10) and imaging optics which are arranged between laser diode array (10) and photoconductor (17) and are configured in such a way that they image the excitation pattern of the image source optically and free of distortion on the photoconductor (17) as an image point pattern.

9 Claims, 2 Drawing Sheets

ARRANGEMENT AND PROCESS FOR GENERATING A MATRIX IMAGE ON A PHOTOSENSITIVE RECORDING SUBSTRATE

BACKGROUND OF THE INVENTION

Field of the Invention

The present invention relates to an arrangement and a process for generating a matrix image, composed of individual image points, on a photosensitive recording substrate, in particular in an electrophotographic printing device.

Description of the Related Art

In electrophotographic printing, character generation has until now taken place either via a laser-scan module or via LED rows. The latter, for reasons of constructional cost, are limited to resolutions up to about 600 dpi (dots per inch). In the case of laser-scan modules, although resolutions greater than 600 dpi have already been realized, for example for film exposure units, this has only been achieved at relatively low process speeds. The limiting effect is caused here by the necessary rotational speed of the polygonal mirror or of its drive motor which, in the case of resolutions above 600 dpi and process speeds over 0.5 m/s, would have to lie far above the rotational speeds of up to 100,000 rev/min which can be realized industrially today, or far above those of about 14,000 rev/min which are economically practical.

The rotational speed of the polygonal mirror can be calculated as $$f_{pol} = \frac{u \cdot 60}{R \cdot Z \cdot M} \text{ (rev/min)}$$

where:
$f_{pol}$ rotational speed of polygonal mirror
u process speed
1/R resolution
Z number of partial beams
M number of surfaces/polygonal mirror Example: M=10, Z=1, u=1 m/s, 1/R=1200 dpi, here there results a rotational speed of about 286,000 rev/min.

To avoid high rotational speeds, attempts have been made to operate with a plurality of partial beams in parallel. Thus, in the case of using a gas laser (HeNe laser or Ar laser), an acousto-optical deflector was used which permits a plurality of partial beams to be generated independently of each other (typically up to about 10). Such a process is technically very complicated and therefore also very cost-intensive, moreover in the case of very high requirements on the resolution and process speed, the number of partial beams which can be achieved in this way is still not sufficient.

Lasers with laser-scan modules contain, apart from the deflection unit comprising a polygonal rotary mirror, scanning optics. These generally comprise collimation optics which shape the laser beam emerging from the radiation source and expand it to the necessary diameter, as well as a lens system, arranged downstream of the polygonal rotary mirror and having an fθ characteristic, which is primarily used to correct the pyramidal error which occurs. This lens system has no imaging properties since, in the case of laser beam printers, the radiation source is not imaged, but the laser beams are simply a means of generating an image pattern on the recording substrate under the control, for example, of the acousto-optical deflector, the laser being subject to distortions on the path from the laser source to the target, that is to say to the recording substrate. In the case of conventional laser printers, generation of the character image actually only takes place on the photoconductor, using the known deflection means, differing for example from copying devices in which the original is imaged on the photoconductor as far as possible free of distortion with the aid of optics.

U.S. Pat. No. 404,571 discloses a laser scanner for the generation of a matrix image from individual image points on a photosensitive image drum of a printer, which has a laser diode array having a plurality of individually excitable laser diodes and a polygonal rotary mirror which guides the laser beams over the surface of the image drum. In the optical path between the laser diode array and the image drum there are arranged optics having a collimator lens and an fθ lens. These optics serve to focus the laser beams.

Moreover, it is disclosed by European Patent Document EP-A3-0 363 347 to use a laser diode array for the generation of characters on a recording medium by means of thermal changing of its surface. This laser diode array has a plurality of laser diodes which are driven in a phase-shifted manner at high intensity for the formation of a single, common light beam. The object in this case is to generate a single light beam having a uniform intensity distribution in the cross-sectional region, and to increase the intensity of the total beam in such a way that the recording medium is permanently thermally changed. The optics used in the arrangement disclosed are used for focusing the collected beam.

Electrographic high-power printing devices are normally designed, depending on the field of application, for character generation having a specific resolution. Although switching over between the character generation at high resolution and low resolution, for example when changing between draft printing and letter quality printing is normal, for example in the case of desktop laser printers, this takes place within the framework of the software of the character generator, that is to say character fonts of different resolution are loaded, the character generation in terms of hardware normally remaining unchanged.

In the case of electrographic high-power printers, the character quality which can be achieved depends very strongly on the degree of resolution. However, printers with high resolution have up until now had a lower printing power than printers with low resolution. This is disadvantageous if character generation with a different degree of resolution is required, the printing power then being limited by the printing mode with the highest degree of resolution.

SUMMARY OF THE INVENTION

It is therefore an object of the invention to provide a process and an arrangement for generating a matrix image composed of individual image points on a photosensitive recording substrate, in which a character generation with high resolution and high process speeds is possible.

It is a further object of the invention to configure the arrangement in such a way that character generation with a different degree of resolution is also possible at high process speeds.

These and other objects and advantages are achieved in accordance with the arrangement for generating a matrix image composed of individual image points on a photosensitive recording substrate, having —a laser diode array as image source with a multiplicity of individually excitable laser diodes arranged thereon in a predetermined grid for forming an excitation pattern, —a deflection unit guiding light beams from the laser diode array over the surface of the recording substrate, and —imaging optics, which are arranged between laser diode array and recording substrate and are configured in such a way that the excitation pattern of the image source is imaged optically and free of distortion on the recording substrate as an image point pattern, which comprises an electronic changeover arrangement which is coupled to the laser diode array of the image source and has switching elements assigned to the individual laser diodes of the laser diode array and which is connected on one side to a controller selecting the switching elements according to a selected resolution and is connected on the other side to an image data source supplying a data stream, wherein in a printing operation, from the data stream of the image data source the data stream corresponding to the characters to be printed with the resolution selected via the controller and the changeover arrangement is fed to the laser diode array. Advantageous embodiments are provided wherein the individual laser diodes are arranged on the laser diode array corresponding to a maximum basic resolution of N dpi [dots per inch] in one or more rows in an integer sequence, and the basic resolution N dpi is selected such that, by selecting each Mth laser diode, with M≧2, from the integer sequence, a laser diode partial quantity with a resolution of N/M dpi [dots per inch] is established corresponding to a resolution which is relevant for the digital matrix image representation.

The laser diode array is preferably a Vertical Cavity Surface Emitting Laser diode array. The deflection unit has a polygonal rotary mirror as deflecting element. Means for changing the imaging scale of the matrix image on the recording substrate are also provided in a preferred embodiment. Likewise, means for changing the size of the image point on the recording substrate are provided.

An optical diaphragm is arranged in the beam path of one embodiment. In particular, an optical system is arranged between laser diode array and deflection unit and has collimation optics, an aperture for beam limiting and a cylindrical lens.

The recording substrate is a photoconductor. An application of the present invention is in an electrographic printing or copying machine.

If, for character generation, use is made as an image source of a laser diode array having a multiplicity of individually excitable laser diodes and if the excitation pattern generated using this image source is imaged on the photosensitive recording substrate with the aid of imaging optics which operate free of distortion, characters with high resolution may be generated even at high process speeds.

The use of laser diode arrays having a multiplicity of independently drivable laser diodes opens up the possibility of arranging the individual diodes with high basic resolution on the laser diode array and, by driving sub-quantities of the laser diodes, of generating images with other degrees of resolution, for example at lower degrees of resolution. Thus, for example using the same printing device, all the resolutions which are relevant for digital printing can be generated, and this can be accomplished at high process speed.

Furthermore, it is advantageous that a feature according to the invention makes possible the use of polygonal rotary mirror units as deflection units which operate at low rotational speed. Hence, the overall mechanical construction of the deflection module, in particular from the point of view of the susceptibility to vibration, is simplified and cost-effective drive motors with a low power demand and lower requirements on the unbalance limitation of the rotating mirror can be used.

The use of so-called Vertical Cavity Surface Emitting Laser (VCSEL) arrays, which are offered, for example, by the BANDGAP Technology Corporation, Broomfield, U.S.A, and which are also described in U.S. Pat. No. 5,073,041, permits a high scaling (resolution) to be realized without disturbing cross-talk, because of their structure.

Of particular advantage is the use of the arrangement and of the process for image generation in an electrographic printing device in which the photosensitive recording substrate is a drum or strip-shaped photoconductor. The invention can also be used for character generation in offset printing, for example for writing on a photosensitive film or the like.

BRIEF DESCRIPTION OF THE DRAWINGS

Embodiments of the invention are shown in the drawings and will be described in more detail below by way of example.

DETAILED DESCRIPTION OF THE PREFERRED EMBODIMENTS

Figure 1:
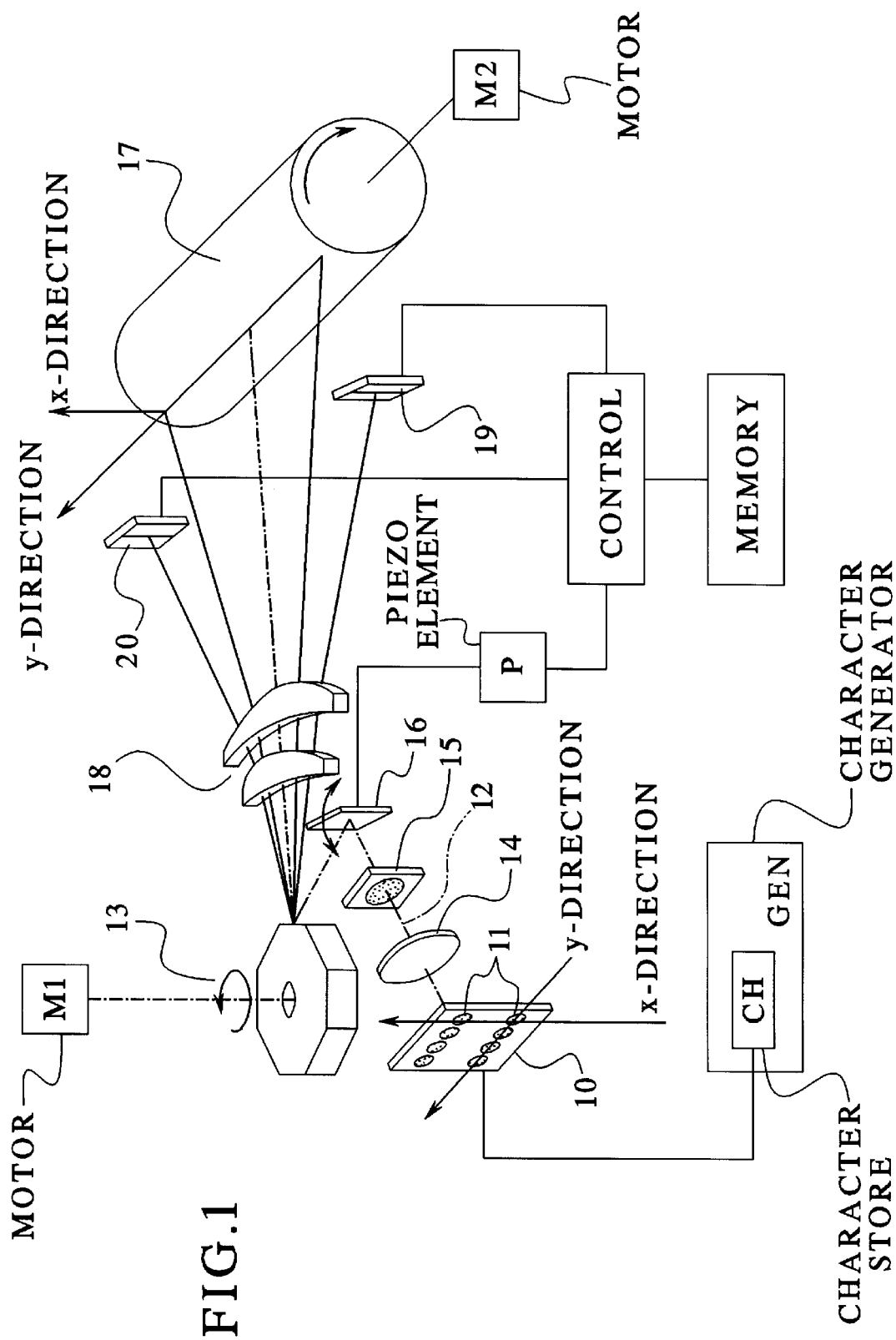
FIG. 1 is a schematic representation in perspective of an electrographic printing device having a multi-row laser diode array as an image source.

An electrographic printing device, whose other construction is described, for example, in PCT application WO 91/09352 and whose drive arrangement is described, for example, in U.S. Pat. No. 4,774,524 has an arrangement, shown in FIG. 1, for generating a matrix image composed of individual image points on a photosensitive recording substrate.

The arrangement contains a laser diode array 10 as an image source having a multiplicity of individually drivable laser diodes 11 which are arranged on the array 10 in one or more rows for emitting laser beams 12. The laser diode array 10 can be designed as a Vertical Cavity Surface Emitting Laser array, as is marketed, for example, by the BANDGAP Technology Corporation, Broomfield, U.S.A. Moreover, the arrangement contains: a deflection unit 13 in the form of a polygonal mirror driven by an electric motor M1; between the laser diode array 10 and deflection unit 13, collimation optics 14, an aperture (diaphragm) 15 for beam limiting, and between the polygonal mirror and a photoconductor drum 17 which serves as a photosensitive recording substrate, which is driven by an electric motor M2, optics 18. The optics 18 and the collimation optics 14 together form the so-called scan optics. The optics 18 have the task, together with the collimator 14, of imaging the laser diode array 14 on the surface of the photoconductor 17. During the imaging of the laser diode array 10, optical distortions inevitably occur in the x-direction and in the y-direction. Whereas the distortions in the y-direction can be compensated for electronically, for example by means of a variable clock, the distortions in the x-direction must be kept as small as possible. It has been shown that an objective with an F ×Sin correction is particularly suitable for this.

In order to keep optical distortions as small as possible, an imaging scale of 1:1 or less is advantageous. However, the problem arises here that only a fraction of the light energy emitted by the laser diodes can be coupled into the beam path. In order to optimize the input coupling, the focal length of the collimator 14 must be shortened or adapted to the emission angle of the laser diodes 11. This adaptation leads to a change in the imaging scale, which typically lies at 4:1 to 10:1 after this optimization.

Polygonal mirrors can be produced only with a finite precision in relation to the angular position of the mirror surfaces (also termed facets). This has the consequence that the deflected beams run out of the ideal plane upward or downward, that is to say in the ±x-direction. This error is designated the pyramidal error. This pyramidal error can be compensated for by means of a tilting mirror 16. Here, the respective mirror error is predistorted by the tilting mirror 16, so that the beam 12 always leaves the polygonal mirror 13 in the exact desired plane. The mirror errors can be measured and stored, for example once during incorporation into the device. The tilting mirror 16, which is preferably driven piezomechanically, receives its setting signal via a line end sensor 20 through a control CON. In the dead time between the line end and the start of the next line, measured via a line start sensor 19, the corresponding setting value from the memory MEM, that is to say the correction value for the next mirror surface, is output to the piezoelectric drive P.

In the case of the electrophotographic printing device described, when in printing operation, elements of characters called up from a character store CH of a character generator GEN are generated in the form of point-like excitation patterns, one after another corresponding to a micro clock signal, on the laser diode array 10 by means of activating corresponding individual diodes 11, are deflected via the deflection unit 13 and are imaged by the optics, free of distortion, on the photoconductor drum 17 microline by microline, and the photoconductor drum 17 is therefore exposed as a function of the characters. The line start detector 19, which is arranged in the scanning area of the deflection unit 13 and is, for example, in the form of a photoelement, serves for detecting the line start. The line end detector 20 serves for line end detection. They supply a line start and line end clock for the printer control. The latent charge image generated in this way on the photoconductor 17 is inked with toner in the normal way via a developer station, is offset-printed on to a recording substrate consisting, for example, of paper, and fixed in a fixing station.

The components of the arrangement will now be described in more detail below:

Image source

Figure 2:
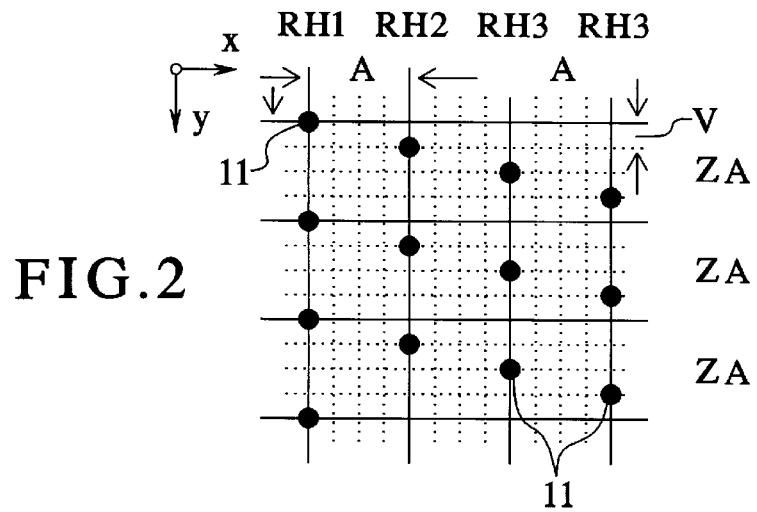
FIG. 2 is a schematic representation of a laser diode array in plan view in which the laser diodes are arranged in four rows, at 2400 dpi basic resolution.
Figure 3:
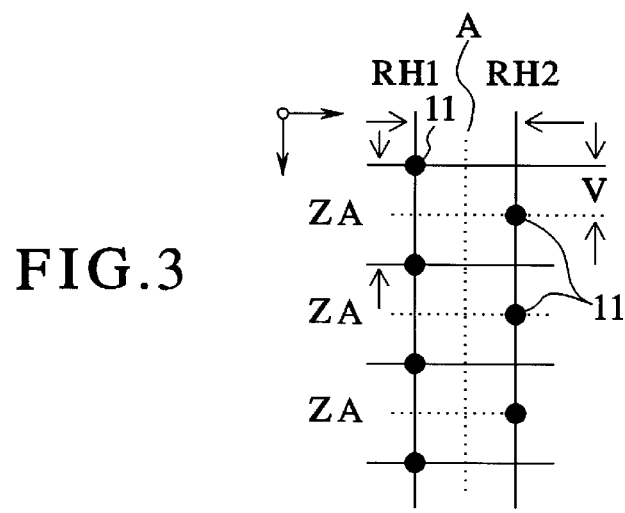
FIG. 3 is a schematic representation of a laser diode array in plan view in which the laser diodes are arranged in two rows, at 1200 dpi basic resolution.

On the laser diode array 10, serving as image source or light source, corresponding to the representation of FIGS. 2 and 3, the individual laser diodes 11 are arranged in a grid, in particular arranged as a function of the desired highest resolution of the excitation pattern or character to be generated. This maximum degree of resolution is designated below as the basic resolution. The laser diode array can in this arrangement comprise a chip on which the diodes are of integrated design or can comprise individual chips assembled, for example, on a common support.

For a basic resolution of 2400 dpi, shown in FIG. 2, with a 1:1 imaging on to the photoconductor, the laser diode array has, for example, 4×16 individually drivable laser diodes 11, which are arranged in 4 rows RH1–RH4 of 16 diodes each alongside each other at a spacing A in the scan direction (arrow in the X-direction) on the support or array. The rows RH1–RH4 are in turn arranged offset from one another in the Y-direction, to be specific offset by an offset V within the matrix row spacings ZA.

The row spacing A (along the abscissa) depends on the possible switching frequency of the diodes and the scanning speed of the deflection unit 13, that is to say on the micro clock signal that is generated. Hence, the resolution in the X-direction is essentially determined by the electronics and the speed of the deflection and not by the geometry of the diode array. In the case of a required resolution of 2400 dpi both in the X-direction and in the Y-direction, the row spacing is preferably selected as an integer part of the basic resolution, in this case 42.6 $\mu$m corresponds to 4×A (600 dpi) =2400 dpi.

The behavior is different in the case of the arrangement of the diodes in the Y-direction. As a result of the imaging, free of distortion, of the array onto the recording substrate, the geometry of the array in the Y-direction corresponds exactly to the geometry of the image in the case of 1:1 imaging. Hence, at a basic resolution in the Y-direction of 2400 dpi, the offset V corresponding to the minimum microline spacing on the recording substrate is 10.6 $\mu$m and hence a spacing ZA, designated as the matrix line spacing, of the matrix lines becomes ZA =42.6 $\mu$m, corresponding to 4×V =600 dpi.

In the case of the two-row diode arrangement, shown in FIG. 3, consisting of 2×16 laser diode rows RH1 and RH2, with a basic resolution of 1200 dpi, the clock-frequency-dependent row spacing A of the diode rows RH1 and RH2 is, for example, 42.6 $\mu$m (600 dpi), and the offset V in the Y-direction is 21.3 $\mu$m (1200 dpi), corresponding to 2×10.6 $\mu$m (offset at 2400 dpi basic resolution). The matrix structure with a matrix line spacing of ZA =42.6 $\mu$m (600 dpi) is maintained.

The diameter of the diodes 11 (VCSEL construction) or of the light exit surface (anode structure) is 5–15 $\mu$m in the example shown. It depends on the constructional technique selected. The number of laser diodes 11 needed per array is application dependent and typically lies between 10 and 100. For example, at a required rotational speed of the polygonal mirror of about 10,000 rev/min and a process speed of 1 m/s, the necessary number of laser diodes per array is about 60. For drive reasons, either a single-row array having 64 diodes or, in the case of multiple lines, 2×32 or 4×16 laser diodes will be selected.

If the individual laser diodes 11 are arranged on the laser diode array 10 in the manner described with a maximum basic resolution of N dpi (for example 2400 dpi, FIG. 2 or 1200 dpi, FIG. 3) in one or more rows, and if the basic resolution N dpi [dots per inch] is selected such that, by means of selecting each second (M =2) or third (M =3) or fourth (M =4), etc. laser diode of the matrix (sequence viewed in the Y-direction), a laser diode partial quantity with a resolution of N/M dpi is established, it is then possible, for example in the case of a basic resolution of 2400 dpi, to realize all the resolutions of 2400/1200/800/600/480/400/300 and 240 dpi which are relevant for digital printing by means of corresponding driving of the diodes 11. If, for example, in the sequence of the diodes, viewed in the Y-direction of the matrix (perpendicular to the scan direction on the recording substrate 17), only each M =2 diode is driven, a resolution of 1200 dpi is obtained. In the case of driving each M =3 diode a resolution of 800 dpi, in the case of each M =4 diode 600 dpi, etc. In the case of a basic resolution of 1200 dpi, resolutions of 600/400/300 and 240 dpi can be realized in this way.

Figure 4:
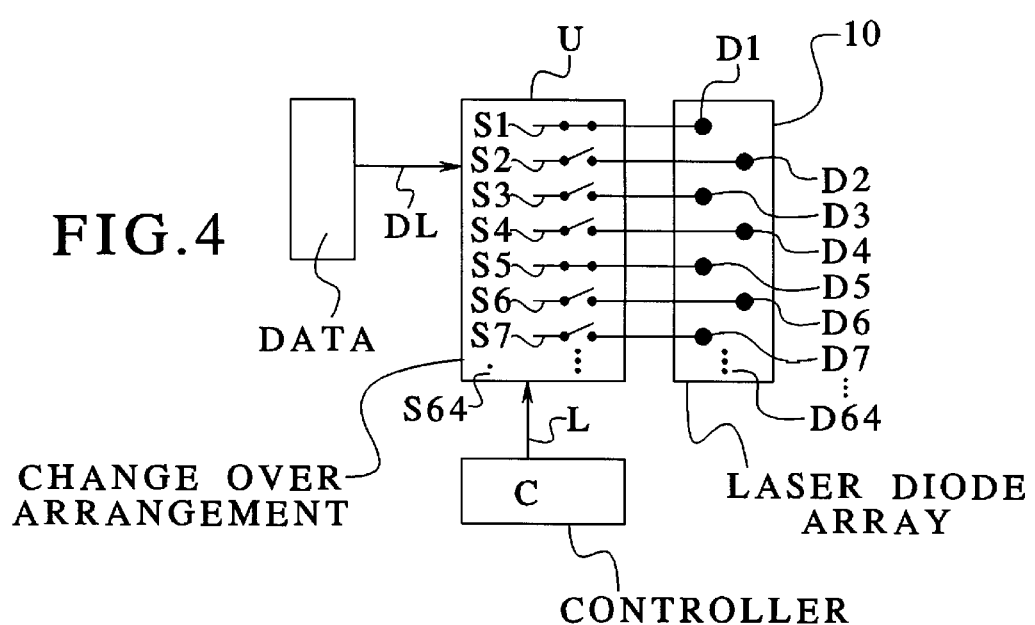
FIG. 4 is a block diagram of a circuit for driving a laser diode array to achieve different resolutions.

This type of resolution-dependent drive may be realized with the aid of an arrangement as is shown in FIG. 4. A laser diode array 10 having two rows RH1 and RH2 arranged thereon and consisting of 32 laser diodes D1–D64 is coupled to a microprocessor-controlled changeover arrangement u made of 64 switching elements S1–S64 assigned to the diodes D1–D64. The changeover arrangement u is connected on one side via signal lines L to the controller C of the printing device, on the other side via data lines DL to a data source DATA of the printer drive. Via the controller, the resolution, which is for example selected via an external input device, of 600 dpi in the case of a prescribed basic resolution of 2400 dpi is fed to the changeover device u in the form of signals and hence the switching elements S1–S64 are brought into the switching position shown. In printing operation, the character to be printed is then fed from the data source DATA of the corresponding data flow to the array 10 with the selected resolution via the changeover device U.

Scanning optics

The laser diode array 10 or the luminous surfaces of the individual laser diodes 11 are imaged row by row on the recording substrate (photoconductor 17) by means of suitable scanning optics which, as already described, apart from the known properties correcting image errors, have additional imaging properties as a result of appropriate lens grinding, to be specific in such a way that they image the array 10 on the photoconductor 17 either at a scale of 1:1 or at another defined scale, for example 1:2 or 2:1, preferably between 4:1 and 10:1, etc.

Apart from the imaging scale, the achievable spot diameter of the image points on the photoconductor 17 also plays an important role in the representation of the matrix image. A certain overlap of the points (light distribution) on the photoconductor is required in order to be able to print closed lines and surfaces. In order to achieve this, the beams 12 emerging from the individual laser diodes 11 should not exceed a specific angular aperture, which is a function of the construction of the array 10 and also of the scanning optics. In the case of VCSEL arrays, the angular aperture typically lies around 8 to 10 degrees of angle. By varying the layer construction or the array construction technology, it can be set within limits. If, using this capability for variation, the desired image point diameter cannot be set on the photoconductor 17, by means of a physical diaphragm (aperture 15), which is arranged in the beam path, preferably between the collimation optics 14 and the tilting mirror 16, the necessary point diameter can be set.

Deflection unit

The deflection unit 13 is a polygonal rotary mirror driven by an electric motor. In the case of using a laser diode array 10 of the type described, the rotational speed can be kept to below 14,000 rev/min, preferably below 10,000 rev/min. This permits the use of a more simple (for example in relation to power demand and limitations) and thus more cost-effective drive motor than is the case in normal laser printers. In addition, the mechanical/optical overall construction of the scanning module is simplified, in particular in respect of the susceptibility to vibration.

Although other modifications and changes may be suggested by those skilled in the art, it is the intention of the inventor to embody within the patent warranted hereon all changes and modifications as reasonably and properly come within the scope of his contribution to the art.

List of reference symbols

10 Laser diode array
11 Laser diodes
12 Laser beam, light beam
13 Deflection unit
14 Collimation optics
15 Aperture, diaphragm
16 Tilting mirror
17 Photoconductor drum
18 Optics with F×Sin correction
19 Line start detector
20 Line end detector
RH1–RHN Grid rows of the diode matrix
A Row spacing
V Offset
ZA Matrix line spacing
D1–D 64 Laser diodes
U Changeover switch
S1–S64 Switching elements
L Controller signal lines
C Controller
DATA Data source
DL Data line

I claim:

1. An arrangement for generating a matrix image composed of individual image points on a photosensitive recording substrate comprising:

a laser diode array of an image source and including a plurality of individually excitable laser diodes arranged thereon in a predetermined grid for forming an excitation pattern.

a deflection unit for guiding light beams from said laser diode array over a surface of the recording substrate, and imaging optics arranged between said laser diode array and the recording substrate and configured in such a way that an excitation pattern of the image source is imaged optically and substantially free of distortion on the recording substrate as an image point pattern, an electronic changeover arrangement coupled to said laser diode array of the image source,
said electronic changeover arrangement including switching elements connected to said laser diodes of the laser diode array, and a controller connected to control operation of the switching elements according to a selected resolution, an image data source connected of said switching elements to supply a data stream to selected ones of said laser diodes, wherein the data stream corresponding to characters to be printed with a resolution selected by said controller and said changeover arrangement is fed to said laser diode array during a printing operation, wherein said laser diodes are arranged on said laser diode array corresponding to a maximum basic resolution of N dpi in at least one row in an integer sequence, and the basic resolution N dpi is selected such that, by selecting each Mth laser diode, where M is at least 2, from the integer sequence, a laser diode partial quantity with a resolution of N/M dpi is established corresponding to a resolution for digital matrix image representation.

2. An arrangement as claimed in claim 1, wherein said laser diode array is a Vertical Cavity Surface Emitting Laser diode array.

3. An arrangement as claimed in claim 1, further comprising:

a deflection unit which has a polygonal rotary mirror as a deflecting element.

4. An arrangement as claimed in claim 1, further comprising:

means for changing imaging scale of the matrix image on the recording substrate.

5. An arrangement as claimed in claim 1, further comprising
means for changing size of the image point on the recording substrate.

6. An arrangement as claimed in claim 5, wherein said means for changing includes:
an optical diaphragm arranged in a beam path of the laser beam.

7. An arrangement as claimed in claim 1, further comprising:
an optical system which is arranged between said laser diode array and said deflection unit, said optical system including collimation optics, an aperture for beam limiting and a cylindrical lens.

8. An arrangement as claimed in claim 1, wherein said recording substrate includes a photoconductor.

9. An electrographic printing or copying machine, comprising:
an arrangement or generating a matrix image composed of individual image points on a photosensitive recording substrate, comprising:
a laser diode array of an image source and including a plurality of individually excitable laser diodes arranged thereon in a predetermined grid for forming an excitation pattern,
a deflection unit for guiding light beams from said laser diode array over a surface of the recording substrate,
imaging optics arranged between said laser diode array and the recording substrate and configured in such a way that an excitation pattern of the image source is imaged optically and substantially free of distortion on the recording substrate as an image point pattern,
an electronic changeover arrangement coupled to said laser diode array of the image source, said electronic changeover arrangement including
switching elements connected to said laser diodes of the laser diode array,
a controller connected to control operation of the switching elements according to a selected resolution,
an image data source connected of said switching elements to supply a data stream to selected ones of said laser diodes, wherein in printing operation the data stream corresponding to characters to be printed with a resolution selected via said controller and said changeover arrangement is fed to said laser diode array, and
means for transferring the image point pattern on the photosensitive recording substrate to a paper; wherein said laser diodes are arranged on said laser diode array corresponding to a maximum basic resolution of N dpi in at least one row in an integer sequence, the basic resolution N dpi being selected such that a laser diode partial quantity with a resolution of N/M dpi is established corresponding to a resolution for digital matrix image representation of selecting each Mth laser diode from the integer sequence, where M is at least 2.

* * * * *